United States Patent [19]
Füssner

[11] 3,870,910
[45] Mar. 11, 1975

[54] ELECTRIC MOTOR PUMP UNIT

[75] Inventor: Paul Füssner, Sindelfingen, Germany

[73] Assignee: Robert Bosch GmbH, Stuttgart, Germany

[22] Filed: Nov. 30, 1973

[21] Appl. No.: 420,706

[30] Foreign Application Priority Data
Jan. 30, 1973 Germany............................. 2304360

[52] U.S. Cl.................... 310/66, 310/43, 310/44, 310/269, 417/423 R
[51] Int. Cl................................... H02k 7/14
[58] Field of Search.......... 310/42, 43, 44, 216–218, 310/261, 233, 87, 269; 417/423 R

[56] References Cited
UNITED STATES PATENTS

| | | |
|---|---|---|
| 2,387,073 | 10/1945 | Horlacher.................... 310/44 UX |
| 3,229,136 | 1/1966 | Pannell....................... 310/265 |
| 3,244,919 | 4/1966 | Dreuth et al.................. 310/43 X |
| 3,344,513 | 10/1967 | Remmann et al.............. 310/43 X |
| 3,667,870 | 6/1972 | Yoshida et al................. 417/423 |
| 3,754,844 | 8/1973 | Nusser et al.................. 310/43 X |

FOREIGN PATENTS OR APPLICATIONS
979,009 1/1965 Great Britain...................... 310/43

Primary Examiner—Donovan F. Duggan
Attorney, Agent, or Firm—Michael S. Striker

[57] ABSTRACT

A pump is mounted in a housing, together with a drive which comprises an electromotor including a unitary mounting element of sintered material composed of a sleeve-shaped body formed with mounting portions which mount the body for rotation and with a coupling portion which is coupled with the pump for driving the same. A motor armature is mounted on the sleeve-shaped body for rotation with the same, and a collector is also mounted on the body.

10 Claims, 3 Drawing Figures

ELECTRIC MOTOR PUMP UNIT

BACKGROUND OF THE INVENTION

The present invention relates generally to a pump unit, and more particularly to a pump unit for liquids, especially for liquid fuels such as are used in combustion engines of automotive vehicles.

It is already known to provide pump units of this general type here in question. Basically, they utilize a housing, a pump mounted in the housing and a drive for the pump. The drive is an electromotor which must be mounted in the housing and whose armature or rotor must be mounted for rotation. In the prior art, the various supporting components for the armature, that is the components which support the armature and which mount it for rotation, are individual elements which must all be very precisely machined to exact tolerances. Evidently, this is expensive not only in terms of manufacturing costs due to the precise machining, but also in terms of labor for assembling the various components. Moreover, since a number of components are required for this purpose, a correspondingly large stock must be maintained from which these pump units are assembled.

SUMMARY OF THE INVENTION

Accordingly, it is a general object of the present invention to overcome the disadvantages of the prior art.

More particularly, it is an object of the present invention to provide a pump unit of the type in question which is very simple in its construction, and which therefore can be produced at significantly lowered expense, and can similarly be assembled much more economically than heretofore.

An additional object of the invention is to provide such a pump unit wherein the number of component parts is substantially reduced as compared to the prior art, so that stocking requirements are simplified.

In keeping with the above objects, and with others which will become apparent hereafter, one feature of the invention recites, in a pump unit, particularly for liquid fuels, in a combination which comprises a housing and a pump in the housing. A drive is provided for the pump and comprises an electromotor also located in the housing. The electromotor includes a unitary mounting element of sintered material. The mounting element is composed of a sleeve-shaped body formed with mounting portions which mount the body for rotation and with a coupling portion which is coupled with the pump for driving the same. The motor armature is mounted on the sleeve-shaped body for rotation with the same, and a collector is also mounted on the sleeve-shaped body.

This construction provides manifold advantages over the prior art. In the first place, it is particularly suited for mass production without requiring any machining of the unitary mounting element. The latter is produced integrally with the mounting portion and the coupling portion as a single element by sintering of appropriate material, such as metallic material, so that the manufacturing costs are significantly reduced. Furthermore, by providing the armature on the sleeve-shaped body, for instance by press-fitting it onto the same, an improved sintering of the armature is obtained. The dimensions of the unitary mounting element will, of course, always be identical in every mounting element which is produced, being predetermined by the moulding tools in which the component is moulded of the sinter material. This not only reduces the number of rejects, but also further improves quietness of operation during rotation, especially in view of the fact that—as compared to the prior art, where several components were required for mounting the rotor and dimensional tolerances existed in each of the components due to the machining thereof—this compounding of the effects of different dimensional tolerances is avoided in the present invention. Balancing of the armature is also not necessary anymore, and this is due to the fact again that the dimensions of the armature package are determined by the tools in which the unitary mounting component is produced. The provision of the unitary coupling portion provides for an axial fixing of the mounting component against movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
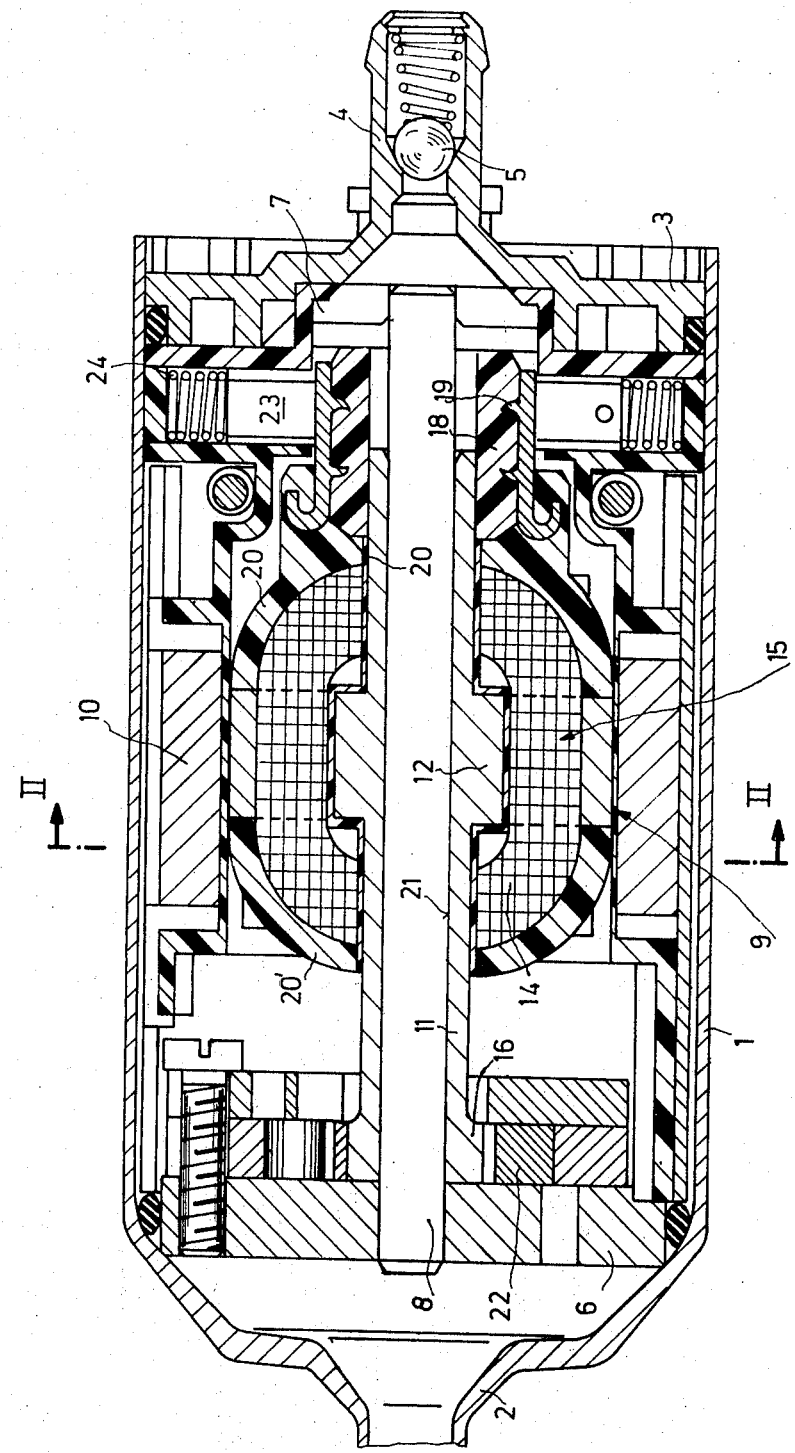
FIG. 1 is a longitudinal section through a pump unit according to the present invention.
Figure 2:
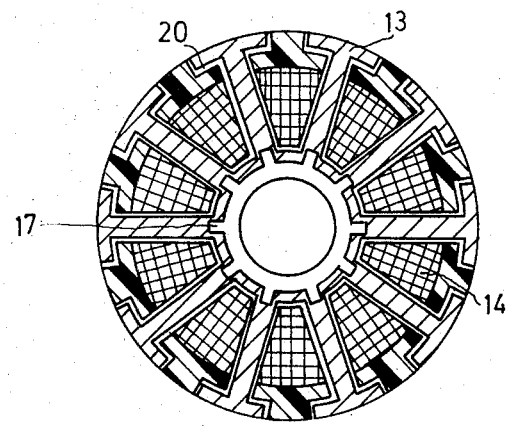
FIG. 2 is a section taken on line II—II of FIG. 1.

Referring firstly to the embodiment in FIGS. 1 and 2, it will be seen that reference numeral 1 identifies the substantially cup-shaped housing of the unit which is provided at one end with an inlet 2 and at the opposite end with a cover 3 which is formed with an outlet 4. A one-way valve 5 is mounted on the outlet 4 so that liquid being pumped can leave the latter but cannot flow back in.

A bearing plate 6 is provided in the housing 1, and in the cover 3 there is provided a mounting portion 7; a shaft 8 is mounted in the plate 6 and the portion 7. An armature 9 of an electromotor is turnably journalled on the shaft 8. The magnetic segments 10 of the electromotor are mounted at the center of the housing and along the inner circumference of the latter.

According to the present invention, the armature 9 is formed with a unitary supported element which is produced of a sintered material and is composed of a sleeve-shaped body 11 the center portion of which is provided with a cylindrical thickening 12. In star-shaped manner, spokes 13 of approximately T-shaped cross section project outwardly from this portion 12. The spokes are protected by an insulating layer 20 and located intermediate the spokes is the winding 14 of the armature 15.

A coupling portion 16 is formed at one axial end of the sleeve-shaped body 11 and in this embodiment is composed of short outwardly extending projections or noses 17. It should be noted that the coupling portion 16 and the spokes 13 constitute with the sleeve-shaped body 11 an integrated unitary component, on which at the opposite end from the coupling portion 16 there is press-fitted a collector 18 with its collector hooks 19.

Once the winding 14 and the collector 18 are in place, a synthetic plastic material—such as polyamide—is sprayed onto them or injection moulded about them, forming a protective layer 20'. The armature or rotor 9 is formed with a bore 21 through which the shaft 8 extends.

The coupling portion 16 is connected with the impeller of the pump 22, for instance the rotor of a rotary pump or the like. Such pumps are known and require no further discussion for those skilled in the art. The element 7 is provided with a plurality of carbon brushes 23 which are pressed by springs 24 against the collector 18. The coupling portion 16 engages the plate 6, as shown in FIG. 1, and thus serves to axially fix the rotor 9 against displacement.

Figure 3:
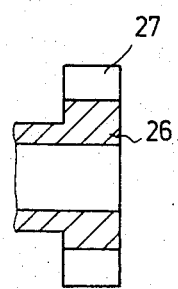
FIG. 3 is a sectioned fragmentary detail view, illustrating a somewhat modified embodiment.

The embodiment of FIG. 3, finally, shows that the coupling portion can be in form of a disc 26 with radially extending projections or noses 27, with both the disc 26 and the noses 27 being integral with the mounting and supporting component as before. In all other respects the embodiment of FIG. 3 is similar to that of FIGS. 1 and 2.

It will be understood that each of the elements described above, or two or more together, may also find a useful application in other types of constructions differing from the type described above.

While the invention has been illustrated and described as embodied in a pump unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a pump unit, particularly for liquid fuels, a combination comprising a housing; a pump in said housing; an electromotor located in said housing for driving said pump and including a unitary mounting element of sintered material composed of a sleeve-shaped body integrally provided with a plurality of spokes projecting outwardly therefrom, and with a coupling portion which is coupling with said pump for driving the same, a motor armature comprising said spokes and armature windings mounted on said spokes, and a collector mounted on said sleeve-shaped body; and means mounting said sleeve-shaped body and the elements mounted thereon for rotation.

2. A combination as defined in claim 1, wherein said means mounting said sleeve-shaped body for rotation comprises a shaft extending through said sleeve-shaped body and mounted on opposite ends in said housing.

3. A combination as defined in claim 1, and an electrically insulating layer surrounding and protecting said windings.

4. A combination as defined in claim 3, wherein said spokes are of T-shaped cross section.

5. A combination as defined in claim 1, said sleeve-shaped body having two spaced end regions, and said coupling portion being provided at one of said end regions.

6. A combination as defined in claim 5, and further comprising a layer of insulating material surrounding said collector and said armature, including said armature windings.

7. A combination as defined in claim 6, wherein said insulating material is polyamide.

8. A combination as defined in claim 3, wherein said sleeve-shaped body has a thickened portion in the region where it is formed with said spokes.

9. A combination as defined in claim 1, said coupling portion being composed of a plurality of relatively short outwardly extending projections provided at one axial end of said sleeve-shaped body.

10. A combination as defined in claim 1, said coupling portion being configurated as a disc having a plurality of radially outwardly extending projections.

* * * * *